(No Model.)
A. WILLIAMS & W. R. PHILLIPS.
ELECTRICAL GOLD AND SILVER EXTRACTOR.
No. 548,150. Patented Oct. 15, 1895.
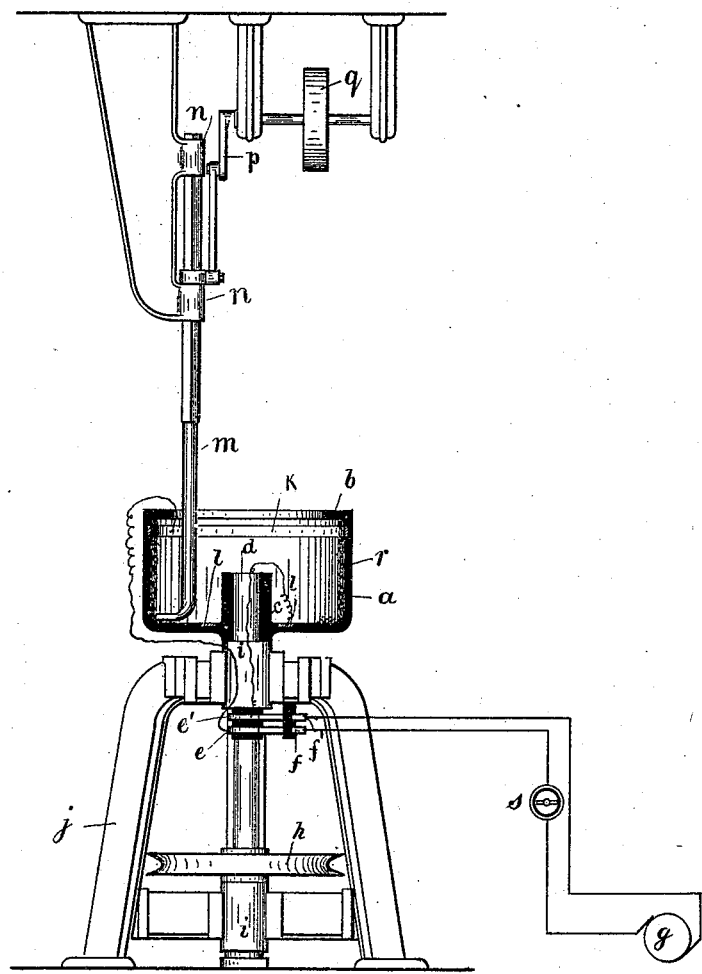
WITNESSES:
A. C. Pfaff.
E. C. Deghuée
INVENTORS
ALFRED WILLIAMS & WILLIAM R. PHILLIPS
BY
Edward P. Thompson
ATTORNEY.

UNITED STATES PATENT OFFICE.

ALFRED WILLIAMS AND WILLIAM R. PHILLIPS, OF SEATTLE, WASHINGTON, ASSIGNORS OF ONE-THIRD TO FRED EVERETT, OF SAME PLACE.

ELECTRICAL GOLD AND SILVER EXTRACTOR.

SPECIFICATION forming part of Letters Patent No. 548,150, dated October 15, 1895.

Application filed January 24, 1895. Serial No. 536,034. (No model.)

*To all whom it may concern:*

Be it known that we, ALFRED WILLIAMS and WILLIAM R. PHILLIPS, citizens of the United States, and residents of Seattle, in the county of King and State of Washington, have invented certain new and useful Improvements in Electrical Gold and Silver Extractors, of which the following is a specification.

Our invention relates to the mechanical construction of a machine whose object is to cause the precious metals contained in sands or crushed ore to come into intimate contact with a surface of mercury and by means of electrolytic action of a current to combine with the mercury for purposes of amalgamation.

All the details are set forth in the accompanying drawing, in which the figure is a vertical elevation, partly in section, of the complete apparatus.

$a$ is a cylindrical box or reservoir formed of insulating material and having its upper edge $b$ inwardly overturned at right angles and provided with a central hollow hub $c$, projecting into the box. This hub is fixed upon a rotatable vertical shaft $d$. The shaft $d$ is provided with collecting-rings $e$ and $e'$. Brushes $f$ and $f'$ bear upon the respective rings, which are insulated from each other, the brushes being electrically connected with an electric generator $g$. Also mounted upon the shaft $d$ is a driving-pulley $h$, the bearings for the shaft being $i\ i$, which are carried by a frame $j$. On the inner surface of the box just beneath the inwardly-turned rim $b$ is an electrical terminal $k$ of one polarity, while at the lowest part of the box and within the same is an annular terminal $l$ of the other polarity, both being respectively connected to the collecting-rings $e$ and $e'$. Just escaping the bottom of the box $a$ and entering the same eccentrically is a stirring-rod $m$, vertically reciprocal, being slidable longitudinally in bearings $n$ and joined by a connecting-rod $o$ to a crank $p$, which is driven by a pulley $q$.

The manner of operating this apparatus may be described as follows: Sufficient mercury $r$ is poured into the box $a$ to line its inner surface to the desired thickness when rotated at a suitable speed. This mercury will come into contact with the negative pole or poles $k$, located close to the top of the inner surface of the box. The whole surface of the mercury will then constitute the negative pole; but on account of the smallness of the fixed negative poles and a peculiar action of mercury under electricity when the current passes to the surface of the mercury from the positive pole through the electrolyte the surface of the mercury is cleared, the scum passing to the vicinity of the fixed negative pole. This mercury should not come into contact with the terminal $l$ because it would carry the current directly through from terminal $l$ to the terminals $k$ instead of through the electrolyte to the surface of the mercury and would prevent electrolytic action on the surface of the mercury. For this reason the terminal $l$ is not only on the bottom of the box, but between the center or hub and the cylindrical surface of the box clear of that portion of the box which will be occupied by the lower edge of the rotating mercury. When the box is rotating at a suitable speed and the mercury is in position on the inner surface, a mixture of metalliferous sand or pulp and the electrolyte is introduced. The circuit-closer $s$ is then closed so as to drive the current from the terminal $l$ through the electrolyte and through the mercury to the terminals $k$, so as to clear the surface of the mercury and to act on any particles of metal that may come into contact with its surface. The mixture will, by virtue of the centrifugal force, press evenly on the mercury-surface, but will be caused to expose a new surface to the mercury on account of the action of stirring-rod $m$.

We claim as our invention—

1. An electrical gold and silver extractor, consisting of the combination of an insulated cylindrical box, rotary about a vertical axis, for the purpose as set forth of containing mercury and other liquids, an electric terminal of a given polarity, fixed upon the inner side of the cylinder, and at or near the top thereof, an electric terminal of the opposite polarity, fixed upon the bottom of the cylinder and within the same at or near the center and away from the periphery thereof, a rotary shaft carrying the cylinder and provided with a driving pulley and with electric collecting rings, connecting with the respective electric terminals above named, a stirrer extending eccentrically into the cylinder, and means for vertically reciprocating the same.

2. An electrical gold and silver extractor, consisting of the combination of an insulated cylinder, rapidly rotary about a vertical axis and having an inwardly turned rim, an electrical terminal of a given polarity, located just below the lip formed by the turned over rim, a second electric terminal of opposite polarity, located in the bottom of the box away from its inner cylindrical surface, a hub for the box, into which extends and to which is attached a shaft, provided with a driving pulley, collecting rings insulated from each other, mounted upon the shaft and electrically connected to the respective terminals, a stirrer extending eccentrically into the box and longitudinally reciprocating, a crank and a connecting rod joining the crank to the stirrer.

In testimony that we claim the foregoing as our invention we have signed our names, in presence of two witnesses, this 7th day of January, 1895.

ALFRED WILLIAMS. [L. S.]
    WILLIAM R. PHILLIPS. [L. S.]

Witnesses:
    FRANK W. SHILLESTAD,
    TOM L. HARRINGTON.